United States Patent [19]

Schloegl et al.

[11] Patent Number: 4,910,639

[45] Date of Patent: Mar. 20, 1990

[54] RAW MATERIAL AND FILM PREPARED THEREFROM, HAVING IMPROVED ELECTRICAL PROPERTIES

[75] Inventors: Gunter Schloegl, Kelkheim; Lothar Bothe, Mainz; Guenther Crass; Thomas Wilhelm, both of Taunusstein; Karl E. Helf, Wiesbaden, all of Fed. Rep. of Germany

[73] Assignee: Hoechst Aktiengesellschaft, Frankfurt am Main, Fed. Rep. of Germany

[21] Appl. No.: 311,864

[22] Filed: Feb. 17, 1989

[30] Foreign Application Priority Data

Feb. 19, 1988 [DE] Fed. Rep. of Germany ....... 3805165

[51] Int. Cl.[4] .......................... H01G 1/01; B32B 5/16
[52] U.S. Cl. ..................................... 361/323; 428/220
[58] Field of Search ............................... 361/311–319, 361/323; 428/220

[56] References Cited

U.S. PATENT DOCUMENTS

| | | | |
|---|---|---|---|
| 2,995,688 | 8/1961 | Rosenberg | 361/323 |
| 3,555,377 | 1/1971 | Bullwinkel et al. | 361/318 X |
| 3,649,892 | 3/1972 | Booe | 361/323 X |
| 4,283,453 | 8/1981 | Siefried et al. | 428/212 |
| 4,692,837 | 9/1987 | Crass et al. | 361/313 |
| 4,791,144 | 12/1988 | Nagou et al. | 264/41 X |
| 4,814,221 | 3/1989 | Utsumi | 428/220 |

OTHER PUBLICATIONS

T. J. Hanman, "World Index of Polyolefine Stabilizers", Kogan Page Ltd., London 1982, pp. 12, 202–219, 240–243.

*Primary Examiner*—Donald A. Griffin
*Attorney, Agent, or Firm*—Foley & Lardner, Schwartz, Jeffery, Schwaab, Mack, Blumenthal & Evans

[57] ABSTRACT

A biaxially-oriented film, suitable for use as an electrically insulating film, is disclosed. The film is composed of a highly-pure electrical film raw material based on polyolefins, in particular propylene polymers, and contains carbonate particles as a neutralizing agent. The carbonate particles preferably have an absolute particle size of less than 10 micrometers, a mean particle diameter of less than 0.1 micrometer, a specific surface area of more than 30 m$^2$/g and a degree of whiteness of more than 90%. The film is used as a dielectric in a capacitor and shows improved electrical properties.

19 Claims, 1 Drawing Sheet

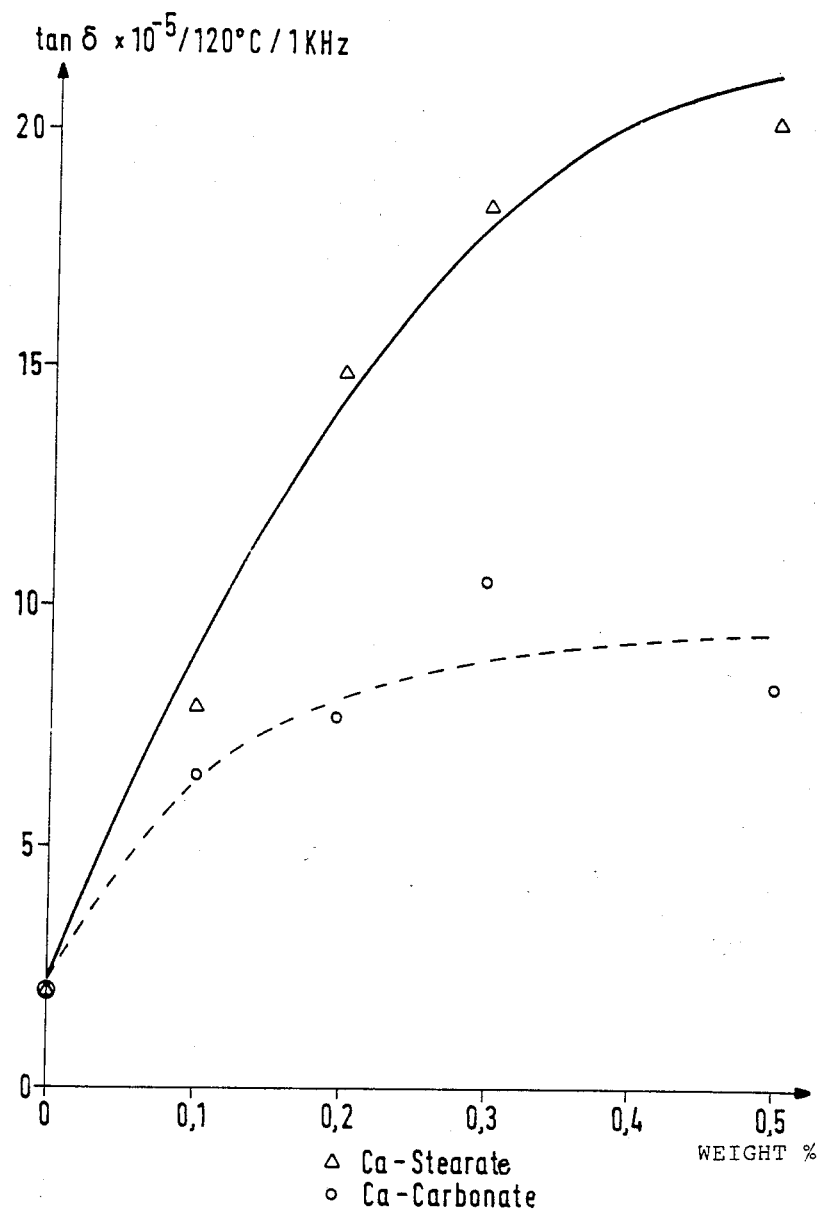

RAW MATERIAL AND FILM PREPARED THEREFROM, HAVING IMPROVED ELECTRICAL PROPERTIES

BACKGROUND OF THE INVENTION

The present invention relates to a biaxially-oriented film, suitable for use as an electrically insulating film, composed of a highly-pure electrical film raw material based on polyolefins, in particular propylene polymers, which film contains a neutralizing agent. The invention also relates to a raw material which is suitable for producing this film, and to the use of the film.

The use of plastic films as electrically insulating materials has been known for a long time. These films are used as a dielectric in capacitors, for cable insulations or as self-adhesive insulating tapes. The requirements to be met by the electrical properties of such films are very stringent. They should have the lowest possible dielectric loss factor and the highest possible breakdown strength, it being required that these characteristic data be constant over time, especially at elevated temperatures, such as occur during the use of these films as intended. If the films, after application of a metal layer, are used in MKP-capacitors, good adhesion between the film surface and the metal is necessary.

Hitherto, attempts have been made to obtain the desired properties by the use of highly-pure raw materials, which have a very low residual ash content of less than 100 ppm, if possible, and are largely free of lubricants and ionogenic and polar constituents. The use of raw materials based on propylene polymers of this high purity for the manufacture of biaxially-oriented electrically insulating films has been disclosed, for example, in European Patent Applications 0,011,796 and 0,222,296.

However, even highly-pure polyolefin raw materials still have a residual content of catalyst residues, which are inevitably caused by the production process. Such catalyst constituents are especially compounds based on aluminum, titanium, magnesium and chlorine. When the raw material is used for the production of electrically insulating films, the active chlorine compounds present or being formed in the raw material must be neutralized, which is done in practice by the addition of calcium stearate.

However, the use of calcium stearate as a neutralizing agent leads to a marked increase in the dielectric loss factor of the electrically insulating film, as compared with the unneutralized material, especially if the film is used at elevated temperatures. Furthermore, the adhesive action, produced by a corona treatment, of the film surface towards metals such as aluminum or zinc with which capacitor films are coated, decreases in an undesired manner. The reason for this presumably is the migration of the materials converted in the neutralization reaction to the film surface in the course of time. The consequence is reduced adhesion of the metal layer and detachment of the metal. A further disadvantage is the evaporation of the stearic acid which is formed from calcium stearate in the neutralization reaction causing undesired depositions on machine parts during film production and film processing. These deposits can fall in the form of waxy drops onto the electrically insulating film and thereby cause a marked deterioration in the quality of the latter.

SUMMARY OF THE INVENTION

It is therefore an object of the present invention to provide a biaxially-oriented film, which is suitable for use as an electrically insulating film and is composed of highly-pure electrical film raw material based on polyolefins, in particular propylene polymers, which does not have the disadvantages of prior art films. The film of this type should in particular show improved adhesion between the film surface and the metal layer, and improved electrical properties for use as an electrically insulating film. This includes the lowest possible dielectric loss factor of the film when in use, especially under a heat load. A further aim of the invention is the elimination of the risk of wax spot formation on the film surface during film manufacture and film processing.

It is a further object of the invention to provide a raw material for the manufacture of a film having these properties.

Surprisingly these and other objects are achieved by a biaxially-oriented film, suitable for use as an electrically insulating film, comprising a highly-pure electrical polyolefin film raw material and a neutralizing agent comprising carbonate particles. In a preferred embodiment, the carbonate particles are calcium carbonate.

Other objects, feature and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The single drawing is a graph of the dielectric loss factor (tan δ) as a function of the content of calcium stearate and calcium carbonate at 120° C. and 1 kHz.

DETAILED DESCRIPTION OF THE PREFERRED EMBODIMENTS

The film according to the invention is composed of a highly-pure electrical film raw material which is free of lubricants and does not contain any ionogenic constituents. Its residual ash content before the addition of neutralizing agent is less than about 100 ppm, n particular less than about 50 ppm, its chlorine content is less than about 50 ppm, in particular equal to or less than about 20 ppm, and its content of neutralizing agent, i.e., carbonate particles, should not exceed about 0.5% by weight, each relative to the total weight of the film. The minimum content of neutralizing agent depends on the chlorine content of the raw material and is usually at least about 0.005% by weight. In general, about 0.1% by weight, in particular about 0.05% by weight, is sufficient as a maximum calcium carbonate content by weight. The absolute particle size should not exceed about 10 micrometers, in particular about 8 micrometers, since larger particles cause specks and blisters, so-called fish eyes, to be formed which because of the air included in them, cause a deterioration in the electrical and also optical properties. It is particularly advantageous if the absolute particle size does not exceed the film thickness, since otherwise these particles protrude from the film surface. For this reason, it is also advantageous to use carbonate particles having the smallest possible mean particle diameter, and an upper limit of about 0.1 micrometer, in particular about 0.07 micrometer, for this average particle size, should not be exceeded. Suitable particles which can be used are especially the carbonates of the alkali metals and alkaline earth metals. Calcium carbonate particles are particularly preferred; for example, they may be composed of natural rock powder, such as calcite, limestone or chalk, unless they are excessively contaminated by other materials.

Preferably, however, carbonate particles are used which have been produced by precipitation and which have an adequate degree of whiteness, so that yellowing of the film is reliably prevented. The degree of whiteness of the carbonate particles should be at least about 90%, in particular about 95%. It is measured as specified in DIN 53163. For a good neutralizing action, it is also advantageous to use carbonate particles having a relatively large specific surface area. It should be at least about 30 m$^2$/g, in particular at least about 40 m$^2$/g (measured by the BET method).

A propylene homopolymer having a high isotactic fraction, in particular of more than about 90%, preferably more than about 95%, is used as the preferred propylene polymer for the preparation of the film. The isotactic fraction is here determined from the mass of the polymer minus the mass of the fraction soluble in n-heptane. The use of a copolymer, which is predominantly composed of propylene units, is also possible in accordance with the invention. Further units of the propylene copolymer are composed of olefins, in particular those having 2 to 6 carbon atoms. Examples of suitable copolymers of propylene are block copolymers or random copolymers of propylene with $C_2$- or $C_4$-olefins, especially with ethylene. The proportion of the propylene units in the copolymer is usually at least about 90% by weight. A polymer mixture which is predominantly, preferably to the extent of at least about 75%, composed of isotactic propylene homopolymer and the copolymer and/or of other polyolefins, especially those having 2 to 6 carbon atoms, is also suitable. Suitable polyolefins in the polymer mixture are especially HDPE, LDPE, LLDPE and poly-4-methyl-pentene-1, the total proportion of these polyolefins usually not exceeding about 15% by weight, relative to the polymer mixture.

Advantageously, the film raw material contains one or more stabilizers from the substance classes of sterically-hindered phenols, phosphites, thioethers and phosphonites, the first two substance classes being particularly preferred. A comprehensive compilation of suitable stabilizers for polypropylene is given by T. J. Henmann in the publication *World Index of Polyolefin Stabilizers*, Kogan Page Ltd., London, 1982. Particularly suitable stabilizers are described in EP-A-0,222,296. These compounds are usually employed in a quantity of up to about 1% by weight, preferably up to about 0.5% by weight, in the film, and lead to a reduction in oxidation phenomena and hence to improved constancy in time of the dielectric loss factor and the dielectric breakdown strength of the film when used in a wound capacitor.

A film according to the invention can be produced either as a monofilm or as a co-extruded film of several layers, these layers being composed of the same propylene polymer or of different propylene polymers. In the case of a film built up from several layers, the carbonate particles are preferably distributed uniformly in all the layers.

To produce the film according to the invention, the melt is extruded through a flat film die, or a plurality of melts is co-extruded, the resulting film is solidified by cooling, then stretched longitudinally at a temperature from 120° C. to 150° C. in a ratio of 4:1 to 7:1 and transversely stretched at a temperature from 160° C. to 170° C. in a ratio of 8:1 to 10:1. Finally, the biaxially-stretched film is heat-set at 150° C. to 160° C.

The invention is explained in more detail by the examples which follow.

For producing monolayered, biaxially-oriented films, a melt of propylene homopolymer having an isotactic fraction of about 96%, a residual ash content of 95ppm before addition of the neutralizing agent, a chlorine content of 20 ppm and a stabilizer content of 0.1%, is extruded through a flat film die. The stabilizer is 1,3,5-trimethyl-2,4,6-tris-(3,5-di- tert.-butyl-4-hydroxybenzyl)-benzene. The films obtained have a thickness of about 10 micrometers. After a corona treatment, their dielectric loss factor tan δ is measured at 1 kHz (120° C.) using a measuring bridge made by Gen Rad GmbH, Munich.

The films differ by their content of calcium carbonate particles, namely 0.1%, 0.2%, 0.3%, and 0.5%. The degree of whiteness of particles is 95%, their absolute size is smaller than 8 micrometers, their mean diameter is 0.02 micrometer and their specific surface area is 100 m$^2$/g. The particles are produced by precipitation.

An analogously-produced comparison film contains neither calcium carbonate nor calcium stearate, and further analogously-produced comparison films each contain the same quantity of calcium stearate, namely 0.1%, 0 2%, 0.3%, and 0.5%. The change in tan δ as a function of the particular content of calcium carbonate and calcium stearate is shown in the figure. It is seen that the dielectric loss factor tan δ retains far lower values with increased calcium carbonate content than in the case of the same calcium stearate content.

One sample of each of the films wit 0.05% by weight of calcium carbonate and calcium stearate is tested for the quality of the adhesion of a metal layer to the film surface by means of an adhesive tape test. For this purpose, a layer of aluminum is vapor-deposited o a thickness of about 0.3 micrometers in a high vacuum. An adhesive tape is stuck to the metal layer and slowly peeled. The quantity of the metal peeled from the metal layer is assessed visually. In this case, only the film containing calcium carbonate shows virtually no metal peeled, whereas peeling of metal is detectable in the case of the film containing calcium stearate. The properties of adhesion of the film according to the invention to the metal layer are thus clearly improved.

During production of all the films having a calcium carbonate content, no interfering deposits are observable in the transverse stretching frame. By contrast, especially in the comparison examples with increased calcium stearate content, deposits of stearic acid appear in the transverse stretching frame and sometimes drop onto the film web and impair the quality of the film as interfering wax deposits. The film produced according to the invention is employed both in KP capacitors (film/foil capacitors) and in MKP capacitors (capacitors made of metallized polypropylene film), preferably in capacitors for those applications where strict constancy over time of the electric and dielectric characteristic data is demanded even at elevated temperatures.

What is claimed is:

1. A biaxially-oriented film, suitable for use as an electrically insulating film, consisting essentially of a highly-pure electrical polyolefin film raw material of a polyolefin predominantly comprising propylene units and a neutralizing agent comprising carbonate particles having a mean particle diameter less than or equal to about 0.1 micrometer.

2. A film as claimed in claim 1, wherein the specific surface area of the carbonate particles is equal to or greater than 30 $m^2/g$, measured by the BET method.

3. A film as claimed in claim 1, wherein the degree of whiteness of the carbonate particles is equal to or greater than 90%, measured according to DIN 53163.

4. A film as claimed in claim 1, wherein the carbonate particles are present in a concentration of 0.005 to 0.5% by weight, relative to the total weight of the film.

5. A film as claimed in claim 1, wherein the film has a thickness of 3 to 30 micrometers.

6. A film as claimed in claim 1, wherein the film is a multi-layer co-extruded film.

7. A film as claimed in claim 6, wherein the carbonate particles are uniformly distributed in the layers.

8. A film as claimed in claim 1, additionally comprising a metal layer.

9. A film as claimed in claim 1, wherein the carbonate particles comprise calcium carbonate.

10. A film as claimed in claim 1, wherein the particle size of the carbonate particles is less than or equal to 8 micrometers.

11. A film as claimed in claim 1, wherein the mean particle diameter of the carbonate particles is less than or equal to 0.07 micrometers.

12. A film as claimed in claim 1, wherein the specific surface area of the carbonate particles is equal to or greater than 40 $m^2/g$, measured by the BET method.

13. A film as claimed in claim 1, wherein the degree of whiteness of the carbonate particles is equal to or greater than 95% measured according to DIN 53163.

14. A film as claimed in claim 1, wherein the carbonate particles are present in a concentration of 0.01 to 0.1% by weight, relative to the total weight of the film.

15. A film as claimed in claim 1, wherein the film has a thickness of 4 to 15 micrometers.

16. A film as claimed in claim 1, wherein the electrical film raw material consists of a propylene homopolymer.

17. A film as claimed in claim 1, wherein the film is a monolayer film.

18. An electrical foil capacitor comprising a film as in claim 1 and a metal layer.

19. A highly-pure raw material, suitable for producing the film as claimed in claim 1, based on polypropylene and containing 0.01 to 0.5% by weight of calcium carbonate particles having an absolute particle size equal to or less than 10 micrometers, a mean particle diameter of equal to or less than 0.1 micrometer, a specific surface area of equal to or greater than 30 $m^2/g$ and a degree of whiteness equal to or greater than 90%.

* * * * *